No. 777,600. PATENTED DEC. 13, 1904.
J. W. CHILDS.
FENCE POST.
APPLICATION FILED MAY 24, 1904.
NO MODEL.

Witnesses
Frank B. Hoffman.
Hubert Lawson.

Inventor
James W. Childs.
By Victor J. Evans
Attorney

No. 777,600.

Patented December 13, 1904.

UNITED STATES PATENT OFFICE.

JAMES W. CHILDS, OF CEDARRUN, PENNSYLVANIA.

FENCE-POST.

SPECIFICATION forming part of Letters Patent No. 777,600, dated December 13, 1904.

Application filed May 24, 1904. Serial No. 209,465. (No model.)

*To all whom it may concern:*

Be it known that I, JAMES W. CHILDS, a citizen of the United States, residing at Cedarrun, in the county of Lycoming and State of Pennsylvania, have invented new and useful Improvements in Fence-Posts, of which the following is a specification.

My invention relates to new and useful improvements in fence-posts, and more especially to means for anchoring the same; and its object is to provide a collar which is adapted to inclose the post on a level with the ground and which is so set in position as to prevent its displacement by frozen ground or frost.

The invention consists of a collar of non-corrodible material into which is adapted to be inserted a post formed of metal or any other suitable material. This post is adapted to be inserted in the ground and through the aperture within the collar, and said collar when in proper position has its upper face in alinement with the surface of the ground and has an air-chamber thereunder to permit expansion and contraction without the displacement of the collar.

The invention consists of the further novel construction and combination of parts hereinafter more fully described, and illustrated in the accompanying drawings, showing the preferred form of my invention, and in which—

Figure 1:
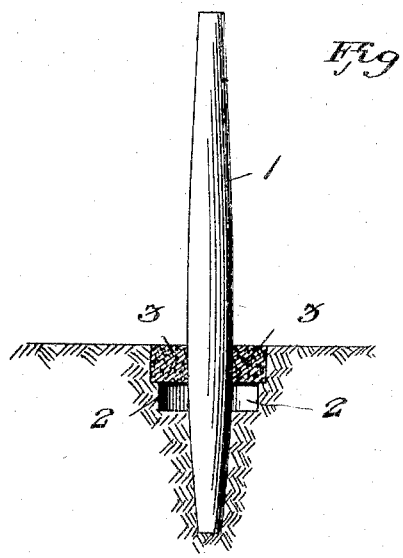
Figure 3:
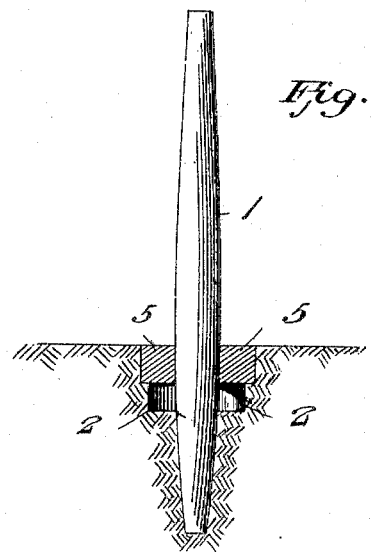
Figure 2:
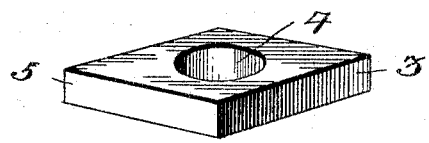
Figure 4:
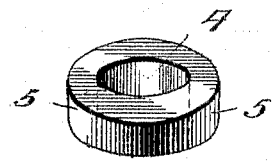

Figure 1 is a section through the collar and adjoining portion of the ground and showing a post in position therein. Fig. 2 is a perspective view of the collar. Fig. 3 is a view similar to Fig. 1, showing the form of collar illustrated in Fig. 4 applied to the post. Fig. 4 is a perspective view of the collar shown in Fig. 3.

Referring to the figures by numerals of reference, 1 is a post, preferably formed of metal and tubular. This post is tapered toward its lower end, which is seated within the ground, and is inclosed by a countersunk recess 2, formed within the ground. A block 3, of stone or like material, is seated within the upper or enlarged portion of recess 2 and has an aperture 4 in the center thereof, through which the post 1 extends. It will be seen that the weight of the block or collar 3 will prevent the post from sagging or becoming accidentally displaced, and by forming a compartment below the same expansion or contraction of the ground is permitted without resulting in the displacement of the post or the block 3.

In Fig. 4 I have shown a construction substantially similar to that disclosed in Fig. 2; but in this construction instead of employing a regular block of stone I use a metallic collar 5. Where the collar is formed of metal, the same is galvanized or treated in any other suitable manner so as to render the same proof against the action of the elements. This construction is especially adapted for use where there is a scarcity of stone. By tapering the lower portion of the post and inserting this reduced part into the opening in the block it will be seen that the post will be firmly supported by the block, as it cannot be pressed downward therethrough.

Having thus fully described the invention, what is claimed as new is—

1. The combination with a block having an aperture therein; of a post having a tapered portion seated within the aperture, whereby said post is supported by the block, the post and block being adapted to be inserted within the ground.

2. The combination of a post having a tapered end adapted to be arranged in a countersunk recess; of a block inclosing the tapered portion of the post and adapted to support said post, said block being also adapted to be seated within the enlarged portion of the recess whereby an air-chamber is formed thereunder.

In testimony whereof I affix my signature in presence of two witnesses.

JAMES W. CHILDS.

Witnesses:
DAVE LEVI,
ROSCOE W. LONG.